Oct. 31, 1967     J. H. SHACKELFORD     3,349,489
MULTIPLE CELLED PRESSURE SENSITIVE DENTAL DEVICE
FOR MEASURING RELATIVE OCCLUSAL PRESSURES
Filed Feb. 7, 1963
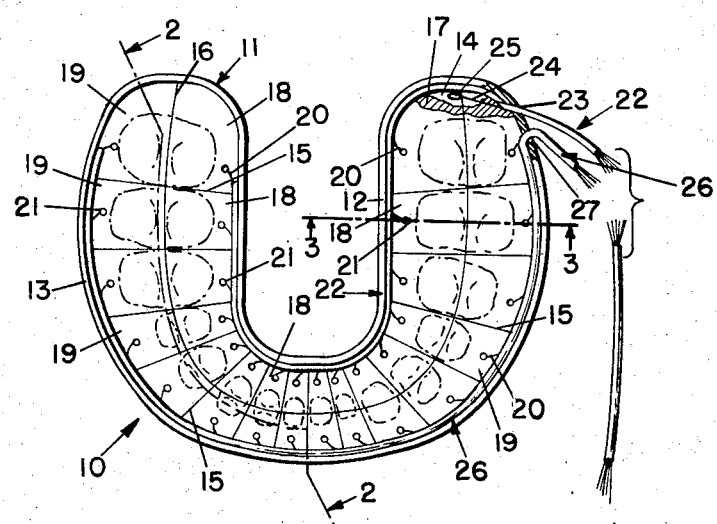
Fig.1
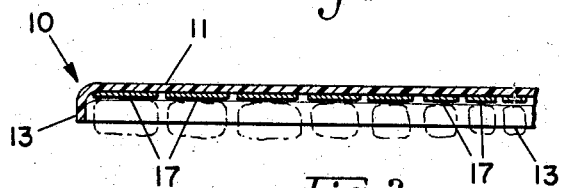
Fig.2
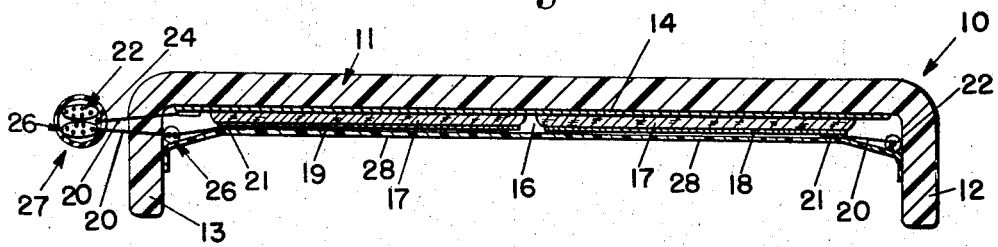
Fig.3
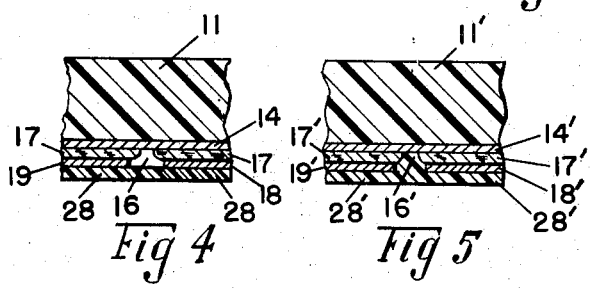 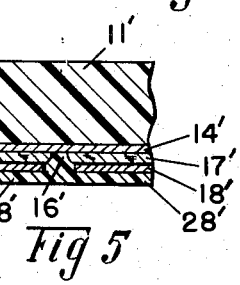
Fig.4    Fig.5
INVENTOR
JOHN H. SHACKELFORD
BY *Felix A. Russell*
ATTORNEY

United States Patent Office 3,349,489
Patented Oct. 31, 1967

3,349,489
MULTIPLE CELLED PRESSURE SENSITIVE DENTAL DEVICE FOR MEASURING RELATIVE OCCLUSAL PRESSURES
John Hinton Shackelford, 706 Latrobe Bldg., 2 E. Read St., Baltimore, Md. 21202; Maryland National Bank, executor of said J. Hinton Shackelford, deceased
Filed Feb. 7, 1963, Ser. No. 256,927
3 Claims. (Cl. 32—19)

The present invention relates to a multiple celled pressure sensitive dental device for measuring relative occlusal pressures and it consists in the combinations, constructions and arrangements of parts herein described and claimed.

This application represents improvements over and an extension of the invention disclosed in applicant's co-pending application Ser. No. 172,219, filed Feb. 9, 1962, and entitled, "Bite Pressure Adjustable Dentures and Method and apparatus for Adjusting the Same."

Generally there is provided a horseshoe-shaped device formed of metal foil and paper, soft plastics or other inexpensive electrically insulating materials, permitting throwaway disposal after individual use. The device is adapted to be positioned between the upper and lower teeth of a patient. It desirably has inner and/or outer flanges constructed to engage the lingual and/or buccal sides of sets of natural or artificial teeth to aid in placing and holding the device in desired position between the upper and lower teeth during a test bite. The device has two electronic wafer-shaped pressure sensitive cells in insulated compartments or areas between each pair of occluding teeth: one cell responding to and measuring pressures exerted between the mating lingual cusps, and the other cell between the mating buccal cusps of each pair of posterior teeth. For the anterior six pairs of teeth the pairs of cells are very closely spaced so as to indicate whether or not there is a true occlusion therebetween.

All of the cells have a common or ground conductor which is a flat horseshoe shaped sheet of metal foil or a laminar conductor coated or printed on the device; or a similarly shaped added or inserted element. Each cell has a live lead wire, which desirably lies within or along margins of the device and is led away from an end of the device in a single cable containing the ground conductor and 32 signal conductors, one from each cell.

During a bite test all cells can be read simultaneously or sequentially as described in applicant's prior application above identified, and a permanent record of the test can be made by photographing a battery of meters, or an oscilloscope screen employed as a meter in known manner.

It is accordingly an object of the invention to provide a dental deivce for measuring relative occlusal pressures during a test bite between natural and/or artificial teeth when clenched.

It is another object of the invention to provide a device of the character described which is of simple, inexpensive construction permitting throw-away disposal thereof after an individual use.

It is another object of the invention to provide such a device having a pair of pressure sensitive cells for each pair of teeth, whereby both lingual and buccal cusp pressures can be obtained for the posterior teeth and indications of actual occlusions can be obtained for the anterior teeth.

Other and further objects of the invention will become apparent from a reading of the following specification taken in conjunction with the drawings, in which:

FIGURE 1 is a plan view of a preferred embodiment of the invention,

FIGURE 2 is an elevational view in longitudinal medial section taken on line 2—2 of FIGURE 1, the showing being inverted for placement over lower teeth, FIGURE 3 is an enlarged elevational view, similarly inverted, in section on line 3—3 of FIGURE 1, FIGURE 4 is a further fragmentary elevational sectional view showing the insulating spacing between adjacent cells, and FIGURE 5 is a view similar to FIGURE 4 showing a modified cell insulating arrangement.

With reference now to the drawings, the numeral 10 generally designates a throw away device embodying the present invention. The device 10 comprises a horseshoe shaped body or base 11 formed of moderately stiff paper, soft or expanded plastic or other inexpensive electrically insulating material. The body desirably has both inner and outer vertically disposed positioning flanges 12 and 13, although it can obviously be made with only one or without either of said flanges, as desired. The flange or flanges engage the lingual and/or buccal sides of the lower teeth (or the upper teeth if found more convenient) to assist in positioning the device and in holding it so placed.

A common or grounded base for all of the electronic pressure sensitive cells may be conveniently formed by a horseshoe shaped piece of metal foil 14 laid on and cemented to the bottom surface of the channel in the body 11. Alternatively, the base conductor formed by the piece of foil 14 could instead be fabricated by printing or coating a conductor of the same size and shape over the bottom surface of the channel in the body 11, in known manners.

The area of the channel is divided by a plurality of transversely or radially disposed lines 15 into areas corresponding to each pair of mating upper and lower teeth and by a horseshoe shaped midline 16 into paired lingual and buccal compartments for each pair of teeth. In each compartment there is deposited on the base conductor 14, as by painting or by laying thereon of a preformed lamina or wafer 17 of a pressure sensitive resistance material of the types disclosed in applicant's prior application above identified. The lines 15 and 16 can be defined by or represent either insulating spaces between the resistance cells, or ribbons or strips of insulating material.

The lingual cells are capped by a series of sheets of metal foil 18 each of the size and shape of its respective compartment and the resistor lamina or wafer 17 therein, to constitute the electrode for the cell. The buccal cells are similarly capped by foil electrodes 19.

Each of the electrodes 18 and 19 is provided with a fine insulated lead wire 20 connected thereto by a spot weld or other terminal means 21. The leads to the lingual cells are gathered into a cable 22 cemented to the inner surface of the body flange 12 and issuing through an aperture 23 adjacent the posterior end of the buccal flange 13 of the body 11. A lead wire 24 to the base or common foil electrode 14 connected thereto at 25 also passes to the exterior of the device 10 through the aperture 23.

The buccal cell lead wires are similarly gathered into a bundle or cable 26 attached to the inner surface of the buccal flange 13 and passing to the exterior through an aperture adjacent the aperture 23 (or through the latter aperture, if preferred). The cables 22 and 26 and the ground lead 24 are then bundled into a single cable 27 which is coupled to a measuring apparatus of the general nature and function of that employed for similar measurements in applicant's prior application above identified.

The assembled cells may be left uncovered or a sheet 28 of paper or flexible plastic can be cemented thereover to aid in holding the elements assembled and to prevent their being displaced during placement over the teeth or during a test bite.

In the modification of FIGURE 5, an insulating lamina

28' is painted or sprayed over the electrodes 18' and 19' and flows into the space therebetween at 16' to form a solid insulating spacer and divider, which, as noted above, could be provided by a lattice-like insulator if preferred. The other elements of FIGURE 5 indicated by primed numerals are identical to their counterparts designated by the same numerals, unprimed, in FIGURE 4.

It should also be noted that the separate electrodes and/or their leads could alternatively be either positioned or printed on the inner surfaces of the channel walls, and the base electrode be laid over the assembled or deposited separate resistor laminae or wafers thereon. The use of an insulating and/or protective lamina over the base electrode foil would be optional.

Since there are two separate cells for each pair of teeth, separate readings for the occlusal pressures between the lingual and buccal cusps for all of the posterior teeth can be obtained, a very desirable result. The paired cells for the anterior six pairs of teeth are located very close together along the incisal biting edges so that, if an incisal edge to incisal edge bite exists, both lingual and labial compartments will register pressures simultaneously to indicate the fact.

While but one form of the invention has been shown and described herein, it will be readily apparent to those skilled in the art that many minor modifications may be made without departing from the spirit of the invention or scope of the appended claims.

What is claimed is:

1. A device for measuring relative occlusal pressures between different pairs of upper and lower teeth, comprising: a body of electrically insulating material shaped in the form of a horse shoe to lie flat between the occlusal surfaces of a plurality of pairs of upper and lower teeth, said body having a retaining flange along at least one edge thereof, a plurality of relatively flat pressure sensitive cells carried by said body in positions corresponding to occlusal pressure areas between said pairs of teeth, each of said cells comprising upper and lower electrodes and a wafer-like pressure sensitive element electrically and spatially interposed between said electrodes, and separate conductors extending from at least one electrode of each cell and adapted to extend to the exterior of the mouth of a patient when in use for connection to electrical apparatus for measuring relative pressure induced changes in an electrical characteristic of each cell.

2. Structure according to claim 1, said flange carrying at least some of said conductors.

3. Structure according to claim 2, at least portions of some of said conductors being printed on said flange.

References Cited

UNITED STATES PATENTS 2,937,443   5/1960   Skinner _____ 32—19

OTHER REFERENCES

Clark: "Pressure Sensitive Material Measures Explosion Forces or Footfall of a Fly." Product Engineering; Sept. 16, 1957, pp. 106–109. (Copy in Scientific Library).

RICHARD A. GAUDET, *Primary Examiner.*

ROBERT E. MORGAN, *Examiner.*